Figure 1:
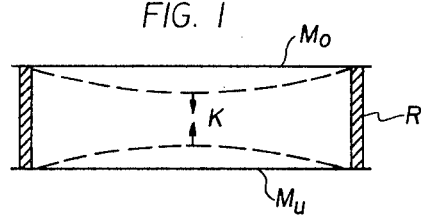

United States Patent [19]

Fishman

[11] 4,413,802
[45] Nov. 8, 1983

[54] DEVICE FOR HOLDING AN OBJECT ON A SMOOTH SHELF SURFACE

[76] Inventor: Avraham Fishman, Klosbachstrasse 110, CH-8032 Zurich, Switzerland

[21] Appl. No.: 197,347

[22] PCT Filed: Nov. 29, 1979

[86] PCT No.: PCT/CH79/00152
 § 371 Date: Aug. 1, 1980
 § 102(e) Date: Jul. 21, 1980

[87] PCT Pub. No.: WO80/01192
 PCT Pub. Date: Jun. 12, 1980

[30] Foreign Application Priority Data

Dec. 1, 1978 [CH] Switzerland ............. 12302/78

[51] Int. Cl.³ .......................... A45D 42/14
[52] U.S. Cl. ............................. 248/362; 248/363
[58] Field of Search ............ 248/362, 363, 206 R; 294/64 R, 64 A; 279/3; 269/21

[56] References Cited

U.S. PATENT DOCUMENTS 2,658,765 11/1953 Ferda et al. .............. 248/362 X

FOREIGN PATENT DOCUMENTS

| 166739 | 2/1950 | Austria ........................ 248/363 |
| 872105 | 5/1952 | Fed. Rep. of Germany . |
| 884232 | 11/1952 | Fed. Rep. of Germany . |
| 2044859 | 4/1971 | Fed. Rep. of Germany . |
| 2211293 | 9/1973 | Fed. Rep. of Germany . |
| 537554 | 7/1973 | Switzerland . |
| 1015347 | 12/1965 | United Kingdom . |

*Primary Examiner*—J. Franklin Foss
*Attorney, Agent, or Firm*—Shlesinger, Arkwright, Garvey & Fado

[57] ABSTRACT

A device for maintaining an object on a surface comprising two membranes kept in spaced parallel relationship by a support ring, the membranes being interconnected at the center thereof by a centering element; by rotation of one membrane with respect to the other, the membranes may be brought closer to each other at the centers thereof or spaced apart at the edges thereof to create a suction gripping effect between an object on the upper membrane and a support surface.

8 Claims, 20 Drawing Figures

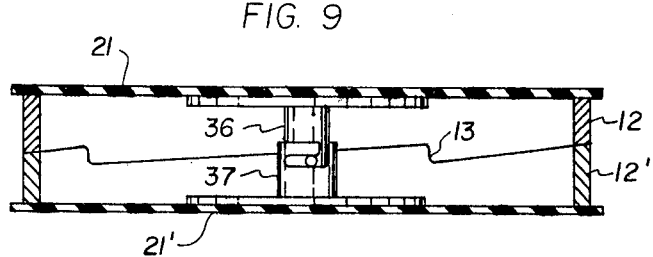
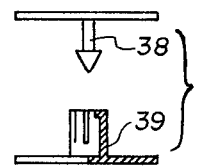
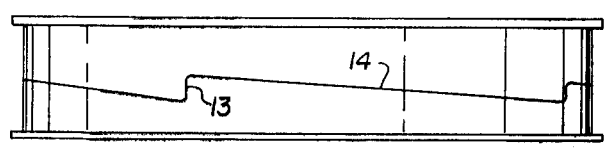
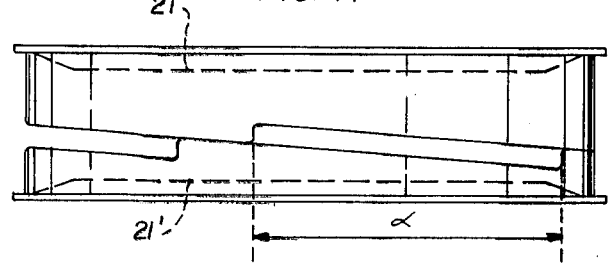
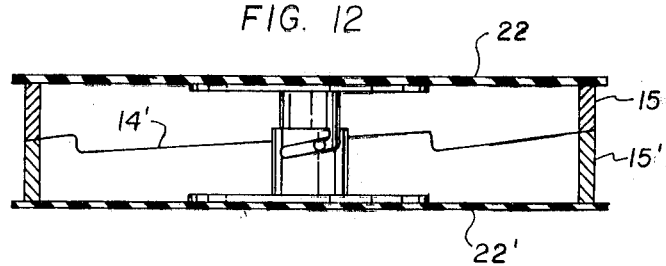

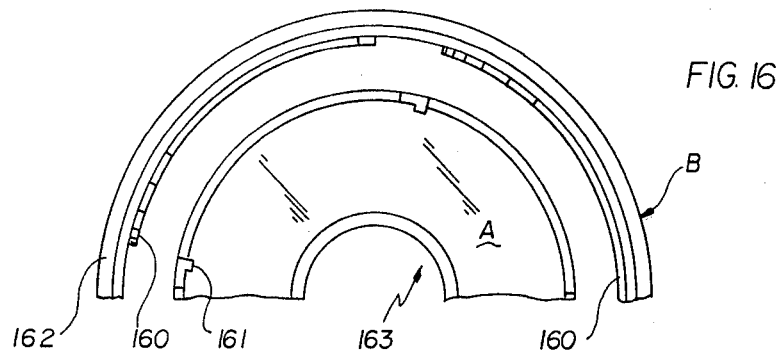
FIG. 16
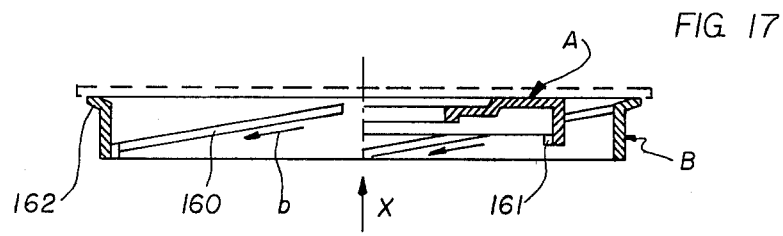
FIG. 17
FIG. 18
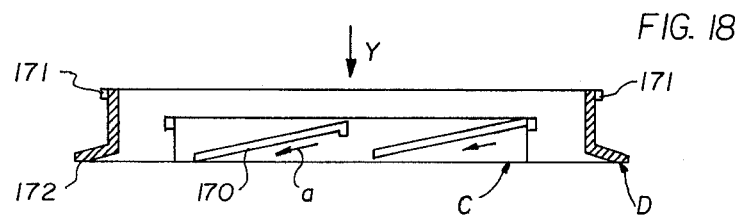
FIG. 19
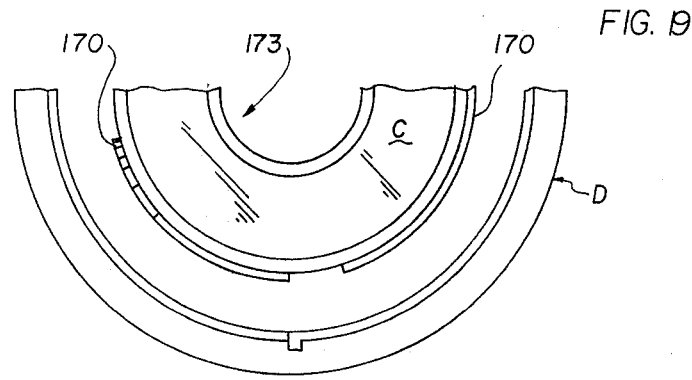
FIG. 20
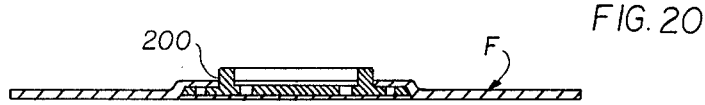

DEVICE FOR HOLDING AN OBJECT ON A SMOOTH SHELF SURFACE

The invention relates to a device for holding an object on a smooth shelf surface.

Frequently the shelf surfaces of cupboards and tables in modern kitchens are provided with plastic plates of very smooth surfaces. These are easily cleaned, however they are inconveniently smooth when stirring dough, beating or mixing, because the bowls or pot slips on the smooth surface. Again, dishes and plates easily slip on such smooth surfaces.

Similar problems are encountered when fixing objects aboard ships. The tossing and rolling motion of a ship require additional fixation.

In industry too means are required by which objects for instance must be secured on a smooth vibrating surface against slippage. In this case magnetically adhering means are often used.

It is the object of the invention to create a device by which an object shall be securely held on such a surface and can easily be detached from it again. Use shall be made of the suction-cup effect, which is known per se.

The invention solves this problem using a device characterized by two membranes mutually spaced and parallel to each other, at least one circular supporting ring between these membranes, and at least one centering means located at the center of said support ring, the supporting ring and/or the centering means being operationally connected in threaded manner in such a way that a relative rotation of the membrane is effected and in that the two membranes move apart in the region of the periphery and or approach each other at the center region. The suction-cup effect of the two membranes can be obtained in three different ways. This is explained in relation to the drawing.

The functioning of the above-cited three types of embodiments is shown schematically in the drawing, and several illustrative embodiments are shown in detail.

Figure 2:
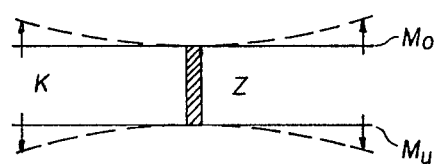
Figure 3:
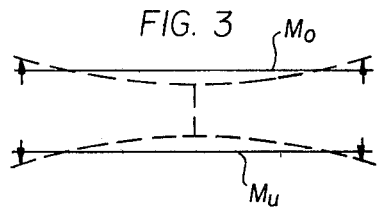
Figure 6:
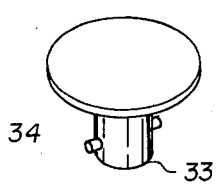
Figure 7:
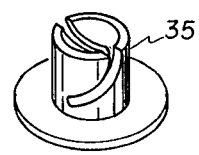
Figure 8:
Figure 4:
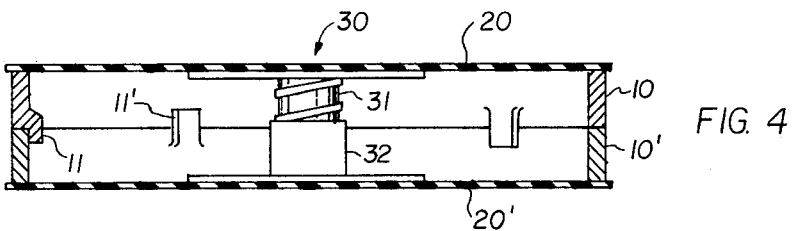
Figure 5:
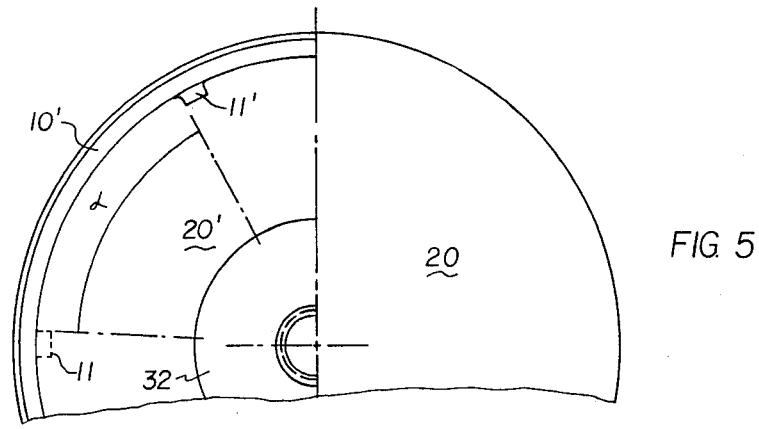
Figure 14:
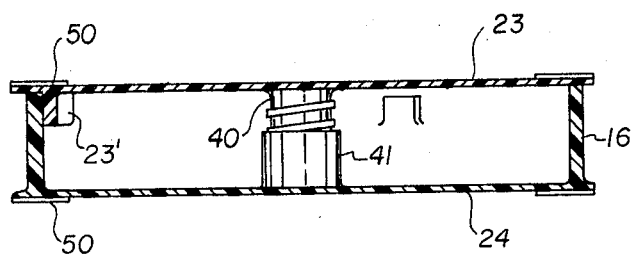
Figure 15:
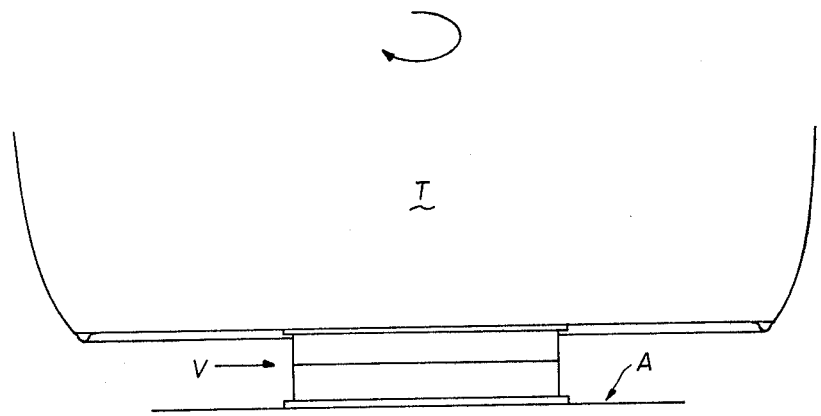

FIGS. 1-3 are schematics of the principle of operation,

FIG. 4 is a device operating on the principle of FIG. 1, shown in cross-section, FIG. 5 is the device of FIG. 4, the left half showing its lower part, the right half its upper part, as top views, FIGS. 6-8 are variations in detail, FIGS. 9-11 is a device operating on the principle of FIG. 2 and shown in cross-section, in side-view in the states of rest and operation, FIG. 12 is a device operating on the principle of FIG. 3 and shown in cross-section, FIG. 13 is a variation in detail relating to FIG. 9, FIG. 14 is a variation relating to FIG. 4 with only one supporting ring, FIG. 15 shows the use of a device for holding an object on a flat shelving surface per FIGS. 4 and 5, FIGS. 16-20 shows a detailed illustrative embodiment of a double suction means.

The schematics of FIGS. 1-3 show the three possible operative ways. In the mode of FIG. 1, the upper and lower membranes Mo and Mu resp. approach each other in the center region due to the forces K effective there, while the supporting ring R keeps the membrane rim at the same spacing. The two membranes therefore are shaped as shown in dashed lines form suction cups which fix themselves by suction to a shelf surface and to an object placed at the top on the upper membrane Mo.

The mode schematically shown in FIG. 2 operates on the two membranes Mo and Mu being made distant from each other at their peripheries but kept in their initial position at their center Z. The forces K act on the rim of the membrane.

A third possibility is shown in FIG. 3 as the combination of the two above cited modes. In this case the two membranes are forced apart at the rim and pulled together in the central region.

In all variations, a screw effect implements pulling together or forcing apart.

FIGS. 4 and 5 shown an illustrative embodiment operating on the principle of FIG. 1. The rim consists of two parallel supporting rings 10, 10' which are connected to the peripheral part of the membrane 20, 20'. Stop lugs 11, 11' are mounted inside to the supporting rings 10, 10' whereby the the angle of rotation $\alpha$ of the two rings relative to each other is restricted. A centering means 30 is mounted at the center, which comprises two threaded parts 31, 32 which are connected in operative manner. A shaft 31 with an external thread is mounted to the upper membrane 20 and a sleevelike bearing 32 with inside thread is mounted to the lower membrane 20'.

When the device V is placed on a shelf surface A (FIG. 15) and a pot T is placed thereon and rotated clockwise by the angle $\alpha$, then it will stand firmly and without slippage on the shelf surface.

Instead of using a centering means with a full thread, the shaft 33 can also be provided with a pin 34 passing through it diametrically (FIG. 6) and representing a rudimentary external thread. The mating bearing (FIG. 7) them comprises a sleeve 35 with two diametrically arranged, thread-like slots. If these slots are provided with a U-shaped insertion opening, as shown by FIG. 8, then the slot forms stop means limiting the angle of rotation in both directions.

FIGS. 9-11 show a device operating on the principle of FIG. 2. The two supporting rings 12, 12' are saw-tooth shaped at their contact surfaces, whereby they can be rotated only in one direction in their mutual displacement. The steep sides 13 abut in the rest position (FIGS. 9 and 10) and form stop means against a counterclockwise rotation. For a clockwise rotation the sloping surfaces 14 glide on one another in the manner of a thread and force the membrane 21, 21' apart at the rim.

The centering means 36, 37 mounted at the center in this instance operates as a tension-loaded thrust bearing. The shaft 33 and the sleeve 37 of the bearing are similar to components 33-36 of FIGS. 6 and 7 in their design, except that the slot in the sleeve of bearing 37 is not oblique to, rather perpendicular axis. The slot is provided with an insertion opening and simultaneously forms a stop limiting the angle of rotation $\alpha$ (FIG. 11). As the centering means is required to absorb only axially directed tensional forces, it may also be designed as shown in FIG. 13 as a non-detachable snap-button. If the shaft 38 with its conically designed head is pressed into the elastic receiving sleeve 39, it can no longer be pulled out of it unless destroying it. When using such centering means, stop means similar to those of FIG. 14 must be mounted to the supporting rings. FIG. 11 shows the operational position of the device. The broken lines indicate the position of the membrane 21, 21'.

FIG. 12 shows a device operating on the principle of FIG. 3. The supporting rings 15, 15' correspond roughly to the supporting rings 12, 12' and the centering means 40 approximately to that of FIGS. 6 and 7. As the slope at the supporting ring and the slope in the centering means are directed oppositely, rotating the upper component with respect to the lower one results in forcing the membrane 22, 22' apart at the rim and forcing it together at the center.

The above described devices comprise rubber or rubber-elastic membranes each connected at the tim to one supporting ring and at the center with one part of a centering means.

If the membranes are made thin-walled and from elastic plastic, the device will be adequate with a single supporting ring. Such a device is shown in FIG. 14. The upper membrane 23 is shaped integrally with the shaft 40 of the centering means. Only the membrane rim part is somewhat reinforced, and provided with stop lugs 23' limiting the angle of rotation.

The lower membrane 24 is also of integral design with the rim 16 and the threaded sleeve 41 of the centering means. The two membranes are made from a plastic with a relatively smooth surface. Therefore advantageously soft-elastic rings 50 are mounted on the outside along the rim of the membrane. The rings provide a good seal to the shelf surface and to the lower side of the object to be held, and ensure achieving the desired suction-cup effect.

The design of the mutually gliding sloping surfaces 14 of the supporting rings assumes essential significance. It is appropriate for instance to let the sloping surfaces 14 merge into plane bases at the two end positions as there is a slight tendency for the two membranes to slip back into the rest position. It is also possible to provide the sloping surfaces 14' (FIG. 12) with an increasing and then decreasing slope so that the largest lift will be overcome with a still lesser force.

Furthermore an indexing means in both end positions may be provided that shall hamper an undesired relative rotation of the two membranes.

FIGS. 16–20 show an illustrative embodiment of which the operation corresponds to the functional diagram of FIG. 3. FIG. 16 is a view in direction X of FIG. 17. FIG. 17 shows two rings A and B in cross-section. Similarly FIG. 19 is a view of FIG. 18 in the direction Y, FIG. 18 showing a ring D in cross-section and ring C in elevation.

The device consists of four plastic rings A, B and C, D and of two membranes F. The components A and B are simultaneously injection molded, the concentric rings being joined to one another by connecting straps (omitted) to be mounted later. The outer ring B is provided with four inside thread bars 160, while the inside ring comprises four inwardly projecting studs 161. The outer ring B has a rim 162 to which is fixed the outer rim of the membrane F, and the inside ring A has a bore 163 in which is fixed the central part 200 of membrane F.

Parts C and D also are concentric rings, for which however the inside ring C is provided with four outside thread bars 170 and the outside ring D with four outwardly pointing studs 171. As described above, the membrane F is in this case to mounted to the rim 172 of the outer ring D and into the bore 173 of the inside ring C.

The membranes consist of two parts, a hard central fastening flange 200 made of plastic and embedded in the softer plastic F forming the membrane proper. The rim of flange 200 projects from the soft membrane F.

In assembly, the flange 200 of the one membrane is fastened into the bore 163 of ring A of which the rim is fixed to the rim 162 of ring B. Only then are the straps still present from manufacture, the injection molding, between the two rings A and B broken off. These straps do hold the two rings A and B til assembly is finished in mutual concentric and proper angular position. The second membrane is connected in the same manner with the bore 173 of ring C and the rim 172 of ring D.

After the connecting straps between the parts A and B or C have been removed, said parts are connected henceforth only by the membrane F.

Thereupon the components A, B and F and the components C, D and F form in each case one cohesive unit. The rings of the two units are so dimensioned that they can be joined into a doubly acting suction means which becomes effective upon a relative rotation. In such a rotation by about 90° the studs 161 of A glide along the lower side of the outer thread bars 170 of C in the direction of the arrows a in FIG. 18. Simultaneously the studs 171 of D on the inside thread bars 160 of B glide in the direction of the arrows b in FIG. 17. As a consequence the inside rings A and C approach each other while the outside rings B, D are forced apart. In this manner there occurs the desired double suction effect at the lower and upper side of the device.

I claim:

1. A device for resting on and holding an object on a smooth surface by a suction gripping effect, comprising:
    (a) two resilient membranes made of nonslipping elastic material disposed in superposed parallel spaced relation,
    (b) supporting ring means consisting of a continuous ring disposed along the periphery of each of the resilient membranes and extending therebetween for maintaining the membranes in parallel spaced relation and for permitting relative rotational movement of the membranes with respect to each other,
    (c) elongated center connecting means connected between the central sections of the membranes and having two interconnected relatively movable connecting elements which are axially and rotationally movable with respect to each other for permitting relative rotational movement between the membranes,
    (d) at least one of the said means having elements for providing axial displacement such that the axial extent of the ring means is relatively greater than that of the center means so as to bring about a collapse of the two membrane central sections toward one another when the membranes are relatively rotated, and
    (e) at least one of the means also having stop means thereon for limiting relative rotation between the membranes to a predetermined angular rotation whereby when an object having a flat bottom larger than the diameter of the top membrane is placed thereon and rotated, the membranes collapse to a desired point producing sufficient suction between the object and the supporting surface to firmly hold the items in a fixed position on the supporting surface.

2. A device for resting on and holding an object on a smooth surface by a suction gripping effect, as set forth in claim 1, wherein:

(a) the connecting elements of the center connecting means are telescopically interfitted and are threadably engageable with each other, and (b) the stop means is mounted on the supporting ring means.

3. A device for resting on and holding an object on a smooth surface by a suction gripping effect, as set forth in claim 1, wherein:

(a) the connecting elements of the center connecting means are telescopically interfitted one element being a central shaft member and the other an outer sleeve, (b) the stop means is mounted on the connecting means, and (c) the supporting ring means comprises two interfitting relatively slidable rings which have co-acting sloping contact surfaces constituting the elements for providing axial displacement.

4. A device for resting on and holding an object on a smooth surface by a suction gripping effect, as set forth in claim 1, wherein:

(a) the center connecting means includes two concentrically arranged rings which are interconnected by sloping tread bars.

5. A device for resting on and holding an object on a smooth surface by a suction gripping effect, as set forth in claim 4, wherein:

(a) the supporting ring means includes two interfitting relatively slidable sloping contacting surfaces.

6. A device for resting on and holding an object on a smooth surface by a suction gripping effect, as set forth in claims 4 or 5, wherein:

(a) the stop means is mounted on the supporting ring means.

7. A device for resting on and holding an object on a smooth surface by a suction gripping effect, as set forth in claims 1, 3, 4, 5 or 6, wherein:

(a) the supporting ring means includes a raised parallel supporting surface on each of the two supporting rings when the limit of relative movement of the membranes is reached.

8. A device for resting on and holding an object on a smooth surface by a suction gripping effect, as set forth in claim 3, wherein:

(a) the central shaft has an outwardly projecting pin, (b) the sleeve has a pin receiving slot which has an open end portion perpendicular to the axis of rotation and a closed end portion disposed parallel to the axis of rotation of the membranes.

* * * * *